UNITED STATES PATENT OFFICE.

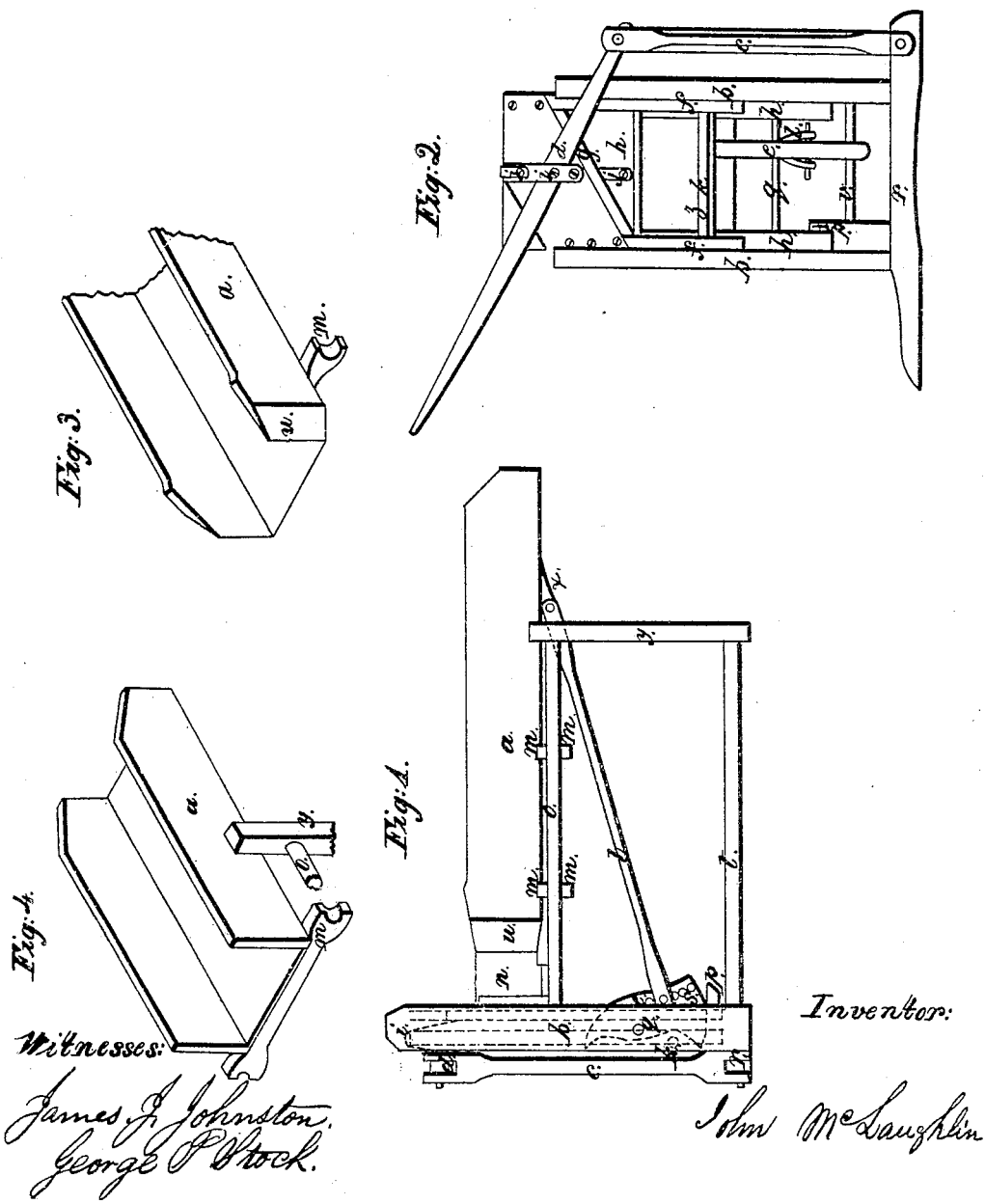

JOHN McLAUGHLIN, OF MONONGAHELA CITY, PENNSYLVANIA.

IMPROVEMENT IN STRAW-CUTTERS.

Specification forming part of Letters Patent No. 35,828, dated July 8, 1862.

*To all whom it may concern:*

Be it known that I, JOHN McLAUGHLIN, of Monongahela City, Washington county, Pennsylvania, have invented certain new and useful Improvements in Straw-Cutters; and I do hereby declare that the following is a full and exact description thereof, reference being had to the accompanying drawings, and to the letters of reference marked thereon.

The nature of my invention consists in an arrangement of levers, cam, slides, cutting and pressing frames in combination with a straw-box which oscillates and moves horizontally, the whole being arranged, constructed, and operated in the manner hereinafter described.

To enable others skilled in the art to make and use my invention, I will proceed to describe its construction and operation.

In the accompanying drawings, Figure 1 is a side view of the straw-cutter. Fig. 2 is an end view. Fig. 3 is a sectional view of the front end of the straw-box. Fig. 4 is a sectional view of the back end of the straw-box.

$a$ is the straw-box, and is furnished with slides $m$, which move on bars $o$. The sides and bottom of the front end of the box at $u$ are beveled off, and a corresponding bevel is made in the guide-box $n$, which is secured to the frame $b$, in which is placed cutting-frame $f$ and press-frame $h$, which move up and down in suitable grooves made in the sides of frame $b$. The frame $b$ is held together by the press-bar $z$, rod $q$, and the front foot, $r$. To the foot $r$ is attached the upright lever $c$, to which is attached the operating-lever $d$, which is secured to the cutting-frame $f$ by means of a pin and guard, $j$.

$e$ is an eccentric cam, which is placed on the bar $q$. To the eccentric-cam and lug $x$ on the bottom of the straw-box $a$ is attached a connecting rod or bar, $l$.

The hind feet, $y$, are held firm and in their proper position by the bars $o$, $t$, and $v$.

$p$ is a foot-piece used in operating the press-frame $h$.

$k$ is a cross-bar, which is placed in the cutting-frame $f$, and is used for operating the eccentric-cam $e$.

$g$ is the cutting-knife, which is placed upon an incline, as represented in Fig. 2.

The press-frame $h$ is connected to the cutting-frame $f$ by means of a strap, $i$.

The operation of my improvement is as follows: The straw is placed in the straw-box $a$, and the weight of the straw being the greatest in the back end of the box it will raise up the front end and thereby prevent the straw from rubbing or chafing on the press-bar $z$ during the feeding process. By raising up the lever $d$ it will raise up the cutting-frame $f$, which raises up the press-frame $h$ by means of strap $i$. The straw is then shoved forward, so as to come under the knife $g$. Now, by pressing down on lever $d$ and down on the piece $p$ with the foot of the operator the straw will be compressed by the frame $h$, cut by the knife $g$ in frame $f$, and the straw-box $a$ will be thrown back by the cross-bar $k$ in frame $f$ coming in contact with the eccentric-cam $e$. Now, by raising lever $d$, which will raise up the frames $f$ and $h$ and cause the cross-bar $k$ to strike the upper point of the eccentric cam $e$, and thereby bring the straw-box forward and thus supply straw to the knife. The length of cut of the straw is regulated by changing the position of the connecting rod or bar $l$ on the eccentric-cam $e$, which may be easily done by means of the holes $s$ in the cam.

Having thus described the nature, construction, and operation of my improvement, what I claim as of my invention, and desire to secure by Letters Patent of the United States, is—

The straw box $a$, furnished with slides $m$, said box having horizontal and oscillating movements, in combination with rod $l$, cam $e$, frames $f$ and $h$, and strap $i$, arranged, constructed, and operated in the manner herein described, and for the purpose set forth.

JOHN McLAUGHLIN.

Witnesses:
JAMES J. JOHNSTON,
GEORGE P. STECK.